(12) United States Patent
Zhao et al.

(10) Patent No.: US 12,179,843 B2
(45) Date of Patent: Dec. 31, 2024

(54) AIRFLOW DEVICE

(71) Applicant: HBPO GmbH, Lippstadt (DE)

(72) Inventors: Gaoming Zhao, Lippstadt (DE); Christian Schneider, Bad Lippspringe (DE)

(73) Assignee: HBPO GmbH, Lippstadt (DE)

( * ) Notice: Subject to any disclaimer, the term of this patent is extended or adjusted under 35 U.S.C. 154(b) by 22 days.

(21) Appl. No.: 18/245,255

(22) PCT Filed: Oct. 22, 2021

(86) PCT No.: PCT/EP2021/079423
§ 371 (c)(1),
(2) Date: Mar. 14, 2023

(87) PCT Pub. No.: WO2022/090094
PCT Pub. Date: May 5, 2022

(65) Prior Publication Data
US 2023/0271651 A1 Aug. 31, 2023

(30) Foreign Application Priority Data
Oct. 28, 2020 (DE) .......................... 102020128372.5

(51) Int. Cl.
*B62D 25/08* (2006.01)
(52) U.S. Cl.
CPC .................... *B62D 25/08* (2013.01)
(58) Field of Classification Search
CPC ...... B60H 2001/00085; B60H 1/00849; B60H 1/00521; B60H 1/3421; B60H 2001/3471; B62D 25/08; B60K 11/085
See application file for complete search history.

(56) References Cited

U.S. PATENT DOCUMENTS

| 5,141,026 A | * | 8/1992 | Collette | .................... F01P 7/10 |
|---|---|---|---|---|
| | | | | 251/229 |
| 8,646,552 B2 | * | 2/2014 | Evans | .................... B60R 19/12 |
| | | | | 180/68.1 |

(Continued)

FOREIGN PATENT DOCUMENTS

| CN | 109109654 A | 1/2019 |
|---|---|---|
| DE | 10306158 A1 | 8/2004 |

(Continued)

OTHER PUBLICATIONS

WIPO, International Search Report (in the priority application), Feb. 7, 2022.

*Primary Examiner* — Reinaldo Sanchez-Medina
(74) *Attorney, Agent, or Firm* — Laurence P. Colton; Smith Tempel Blaha LLC

(57) ABSTRACT

An airflow device suitable for regulating the air intake in vehicle front ends and which has an air intake part through which air can enter the airflow device. The airflow device has an airflow channel which is arranged downstream of the air intake part and connected thereto and through which the air entering through the air intake part can be conducted. The airflow device has at least one air-regulating lamella which is pivotably mounted on the airflow device on a pivot bearing and which is configured and arranged such that it can influence the airflow entering through the air intake part by changing its pivot position. The pivot bearing for the at least one air-regulating lamella is formed by a first bearing portion which is part of the air intake part and by a second bearing portion which is part of the airflow channel.

8 Claims, 4 Drawing Sheets

(56) References Cited

U.S. PATENT DOCUMENTS

| | | | | |
|---|---|---|---|---|
| 2012/0074729 A1* | 3/2012 | Fenchak | ............... | B60K 11/085 |
| | | | | 296/193.1 |
| 2014/0216834 A1* | 8/2014 | Elliott | ................... | B60K 11/085 |
| | | | | 180/68.1 |
| 2015/0152774 A1* | 6/2015 | Ritz | ..................... | B60K 11/085 |
| | | | | 454/155 |
| 2016/0368367 A1* | 12/2016 | Schöning | ............... | B62D 25/08 |
| 2019/0299747 A1* | 10/2019 | Lanard | ................. | B60K 11/085 |
| 2019/0329646 A1* | 10/2019 | Herlem | ................ | B60K 11/085 |
| 2020/0055388 A1* | 2/2020 | Gerber | .................... | B60R 19/52 |
| 2021/0268895 A1* | 9/2021 | Harter | ................. | B60K 11/085 |

FOREIGN PATENT DOCUMENTS

| | | | |
|---|---|---|---|
| DE | 102014106605 A1 | 11/2015 | |
| EP | 0500430 A1 | 8/1992 | |
| EP | 3571080 A1 | 11/2019 | |
| FR | 3051735 A1 | 12/2017 | |

* cited by examiner

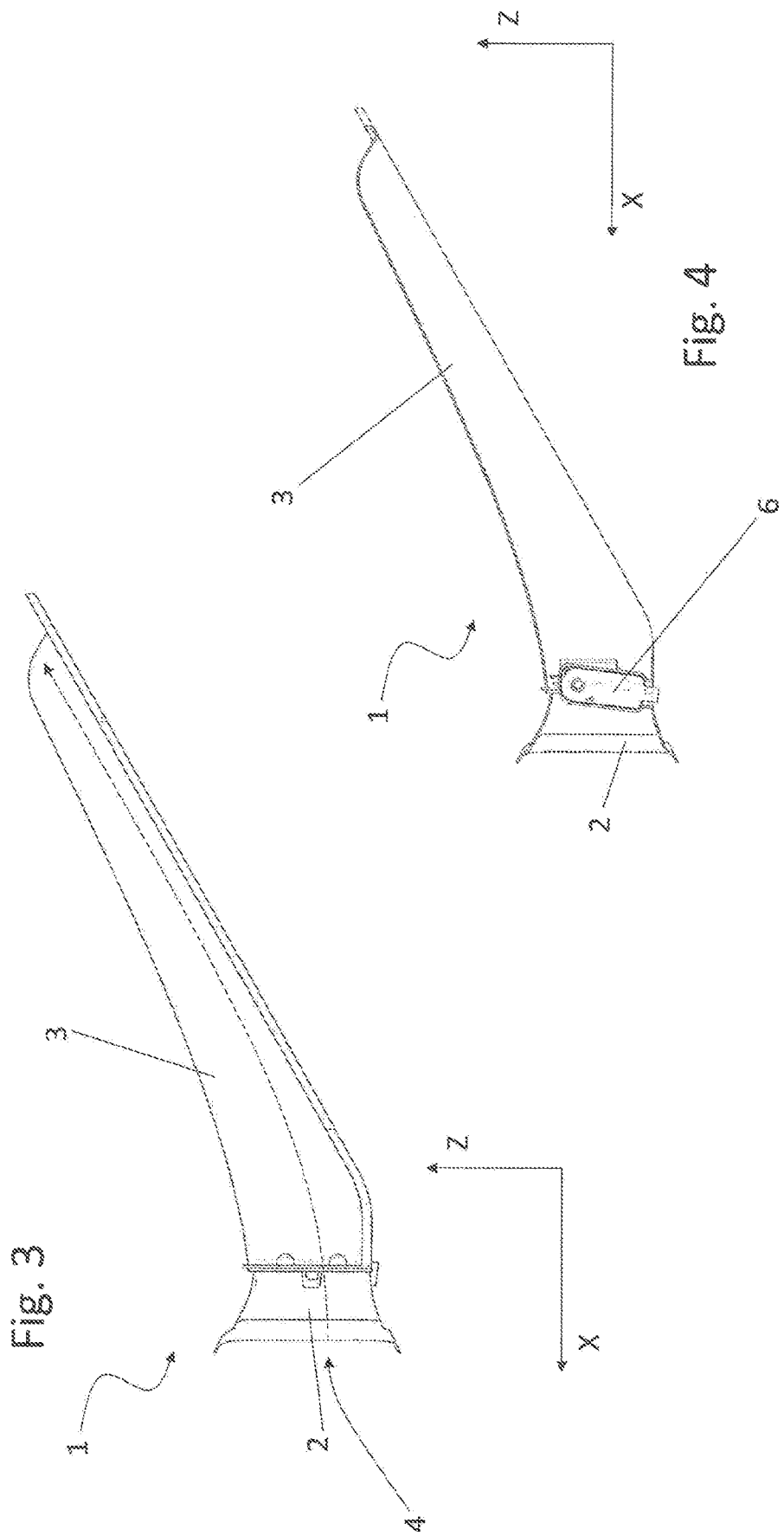

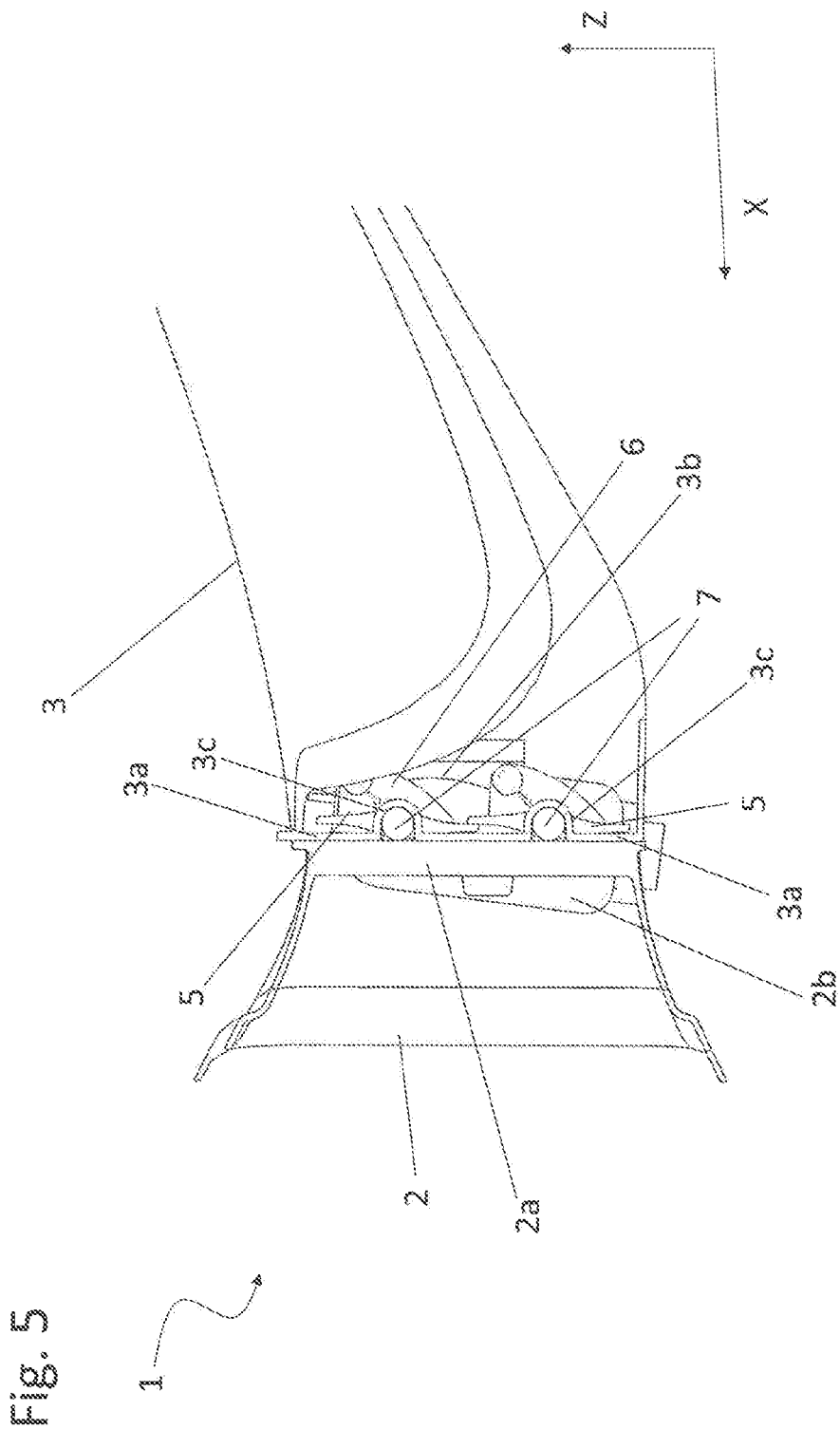

AIRFLOW DEVICE

CROSS REFERENCE TO RELATED APPLICATIONS

This application is the US National Phase of and claims the benefit of and priority on International Application No. PCT/EP2021/079423 having a filing date of 22 Oct. 2021, which claims priority on and the benefit of German patent application no. 10 2020 128 372.5 having a filing date of 28 Oct. 2020.

BACKGROUND OF THE INVENTION

Technical Field

The invention relates to an airflow device for regulating the air intake in vehicle front ends, having an air intake part through which air can enter into the airflow device, as well as an airflow channel arranged downstream of the air intake part and connected thereto, through which the air entering through the air intake part can be conducted, wherein the airflow device has at least one air-regulating lamella which is pivotably mounted on the airflow device on a pivot bearing and is configured and arranged such that it can influence the air flow entering through the air intake part by changing its pivot position.

Prior Art

Such airflow devices are generally used to regulate the air intake in vehicle front ends. Here the air intake is regulated by means of lamellar closure elements. Generally, these air-regulating lamellas can be adjusted via an electric drive.

FR 3 051 735 A1, DE 10 2014 106605 A1, DE 103 06 158 A1, and EP 0 500 430 A1 describe airflow devices, in particular for regulating the air intake in vehicle front ends, having an air intake part through which air can enter into the airflow device, as well as an airflow channel arranged downstream of the air intake part and connected thereto, through which the air entering through the air intake part can be conducted, wherein the airflow device has at least one air-regulating lamella which is pivotably mounted on the airflow device on a pivot bearing and is configured and arranged such that it can influence the air flow entering through the air intake part by changing its pivot position.

Both the drive and the air-regulating lamellas must be correspondingly mounted in the airflow device. The prior art is to provide a special mounting frame which then must be arranged between an air intake part, through which the air enters into the airflow device from the outside, and an airflow channel. In a sandwich design, corresponding seals often must also be introduced between the mounting frame and the airflow channel or the air intake part. On the one hand, the rotary bearings for the air-regulating lamella and, on the other hand, a fastening option for a drive are accommodated in the mounting frame.

From this sandwich design it results that a whole row of components must be mounted before the airflow device is ready for operation. Of course, the more parts that are used, the higher, too, the costs which are associated with the production of such components.

BRIEF SUMMARY OF THE INVENTION

The problem addressed by the present invention is to further develop an airflow device of the aforementioned type, to the effect that the assembly effort is reduced as compared to conventional solutions.

This problem is solved by an airflow device, in particular for regulating the air intake in vehicle front ends, having an air intake part through which air can enter into the airflow device, as well as an airflow channel arranged downstream of the air intake part and connected thereto, through which the air entering through the air intake part can be conducted, wherein the airflow device has at least one air-regulating lamella which is pivotably mounted on the airflow device on a pivot bearing and is configured and arranged such that it can influence the air flow entering through the air intake part by changing its pivot position, characterized in that the pivot bearing for the at least one air-regulating lamella is formed by a first bearing portion which is part of the air intake part and by a second bearing portion which is part of the airflow channel. Additional advantageous embodiments are found in the dependent claims.

The airflow device according to the invention, which is particularly suitable for use in the regulation of the air intake into vehicle front ends, has an air intake part through which air can enter into the airflow device. The air intake device also has an airflow channel arranged downstream of the air intake part and connected thereto. The air entering through the air intake part can be conducted through this airflow channel. The airflow device has at least one air-regulating lamella pivotably mounted on the airflow device on a pivot bearing. This is configured and arranged such that it can influence the air flow which has entered through the air intake part by changing its pivot position. According to the invention, the pivot bearing for the at least one air-regulating lamella is formed by a first bearing portion which is part of the air intake part, and by a second bearing portion which is part of the airflow channel. The pivot bearing is thus only created when the components of the airflow device, namely the air intake part, airflow channel, and the air-regulating lamella, are assembled. In this way, the otherwise typical mounting frame can be omitted without being replaced. Consequently, the number of required components is reduced in the solution according to the invention, and costs are therefore lowered. In addition, installation space can of course be saved since a component is omitted without replacement.

According to a preferred embodiment of the present invention, a fastening element, in particular a fastening flange, is arranged in the region of, in particular on, the end face of the air intake part facing toward the airflow channel, and/or in the region of, in particular on, the end face of the airflow channel facing toward the air intake part. Such a fastening element can, for example, serve to fasten both parts: the airflow channel on the one hand and the air intake part on the other hand. In a corresponding design having a clip function, this can also take place without tools. The assembly is hereby additionally facilitated since additional fastening elements are inasmuch not required. In the preferred embodiment of the components in plastic or the like, such a fastening element, in particular a fastening flange, can be molded on the respective parts.

The same applies to sealing elements which serve to form the connection between air intake part and airflow channel with an optimal seal so that no air can escape at the connection point. Consequently, according to a preferred embodiment of the present invention, it may be provided that an, in particular circumferential, sealing element is arranged in the region of, in particular on, the end face of the air intake part facing toward the airflow channel, and/or in the region of, in particular on, the end face of the airflow channel facing toward the air intake part.

Preferably, as few components as possible should be used in order to keep the assembly effort as low as possible. For this purpose, for example, it can be provided that the first bearing portion is formed integrally with the air intake part. Alternatively or additionally, it can likewise be provided that the second bearing portion is formed integrally with the airflow channel. Depending on the material that is used, the integral nature can also be achieved by molding on corresponding bearing portions or injection molding on the respective component. It is therefore not absolutely necessary that the bearing portion consist of the same material as the component on which it is arranged. This especially makes it possible that materials may be used which are particularly well suited for forming rotary bearings for air-regulating lamellas, while the remaining material of the respective component, air intake part, or airflow channel can then be designed such that it is particularly well suited for the transport of air.

According to the invention, it should be possible to automate the air regulation by the at least one air-regulating lamella. For this purpose, it is provided that the airflow device according to the invention comprises a drive coupled to at least one air-regulating lamella, which drive pivots the at least one air-regulating lamella in the event of an actuation. This drive, which can be an electrically operated actuator, for example, can then be addressed in the vehicle by the controller there. It is thus possible for the driver to automatically or deliberately change the position of the air-regulating lamella(s).

According to the invention, the air intake part has a first drive retention portion, and the airflow channel has a second drive retention portion. In such a configuration, the drive is then received between the first drive retention portion and the second drive retention portion. This considerably facilitates assembly, since separate holders are unnecessary, and the drive can be simply installed upon assembling the airflow device.

According to a preferred embodiment, the drive is fixed to the air intake part and/or the airflow channel. This in turn spares installation space and a separate holder for the drive, which in turn reduces the number of required components.

BRIEF DESCRIPTION OF THE DRAWINGS

The invention is explained in more detail below with reference to the embodiment depicted in FIGS. 1 to 5.

FIG. 3 shows a longitudinal section through the airflow device according to the invention in plane B in FIG. 1.

FIG. 4 shows a longitudinal section through the airflow device according to the invention in plane A in FIG. 1.

FIG. 5 shows another longitudinal section of the airflow device according to the invention in plane B, in an enlarged depiction.

DETAILED DESCRIPTION OF PREFERRED EMBODIMENTS

Figure 1:
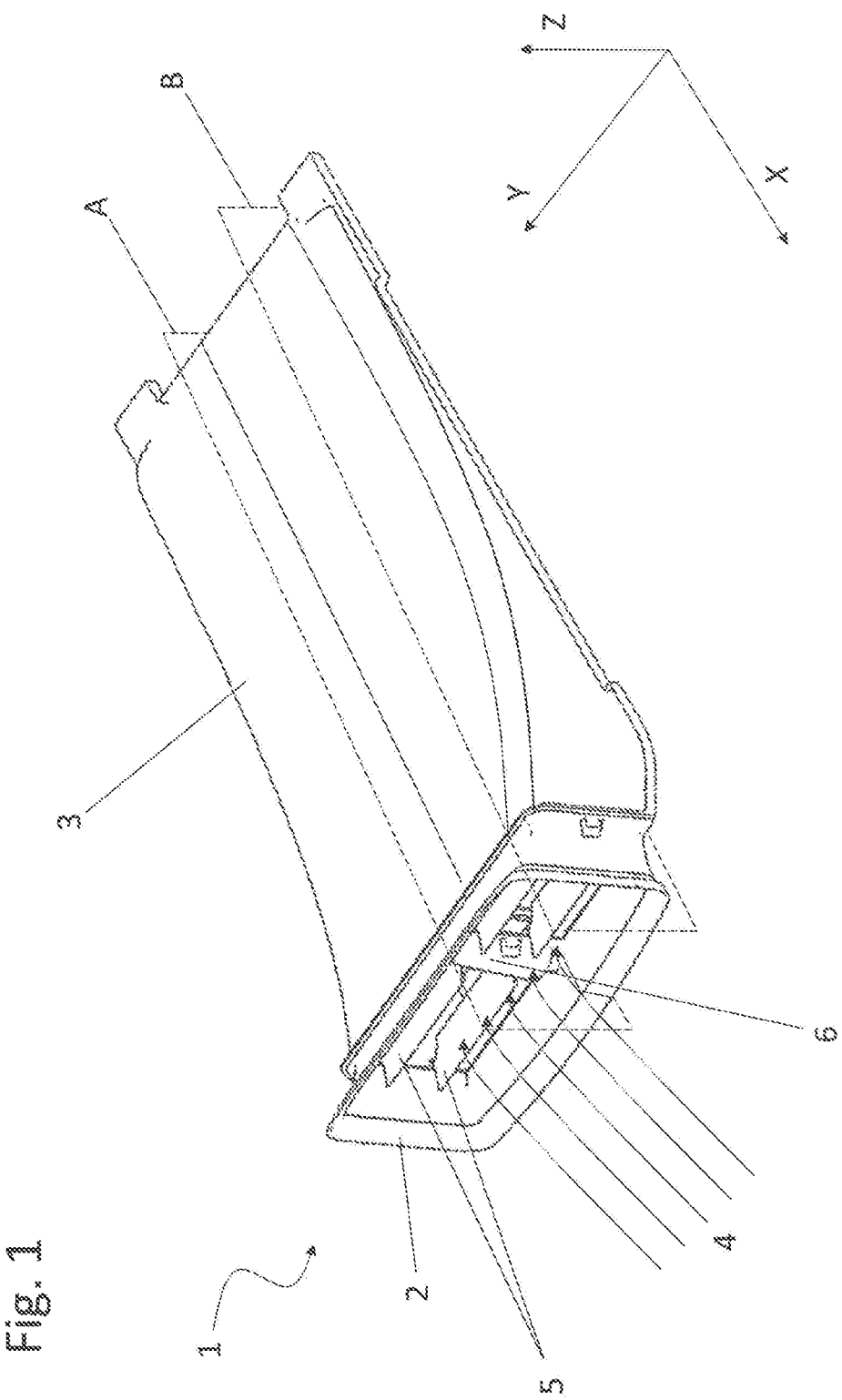
FIG. 1 shows a perspective depiction of an airflow device according to the invention.

In FIG. 1, the airflow device according to the invention is denoted by the reference sign 1. Since it is a component which can be used in particular in vehicle front ends, the direction of travel of such a vehicle is designated with X, the vertical direction with Z, and the transverse direction orthogonal to X and Z with Y.

The airflow device 1 according to the invention has an air intake part 2 through which the air 4 enters into the airflow device 1. After entering, it passes through an arrangement which comprises at least one air-regulating lamella 5. The airflow is discernible in particular at the arrows in the section in plane B (FIG. 1) in FIG. 3. In the example shown in FIG. 2, four air-regulating lamellas 5 are shown by way of example, but there may also be more or fewer of such lamellas. Preferably, a drive 6 is also provided which ensures that the air-regulating lamellas 5 can be interlaced. The pivot axis of the air-regulating lamella 5 preferably runs parallel to the transverse axis Y. The air 4, which has passed through the air-regulating lamellas 5, arrives in the airflow channel 3 and from there further into the interior of the vehicle.

Figure 2:
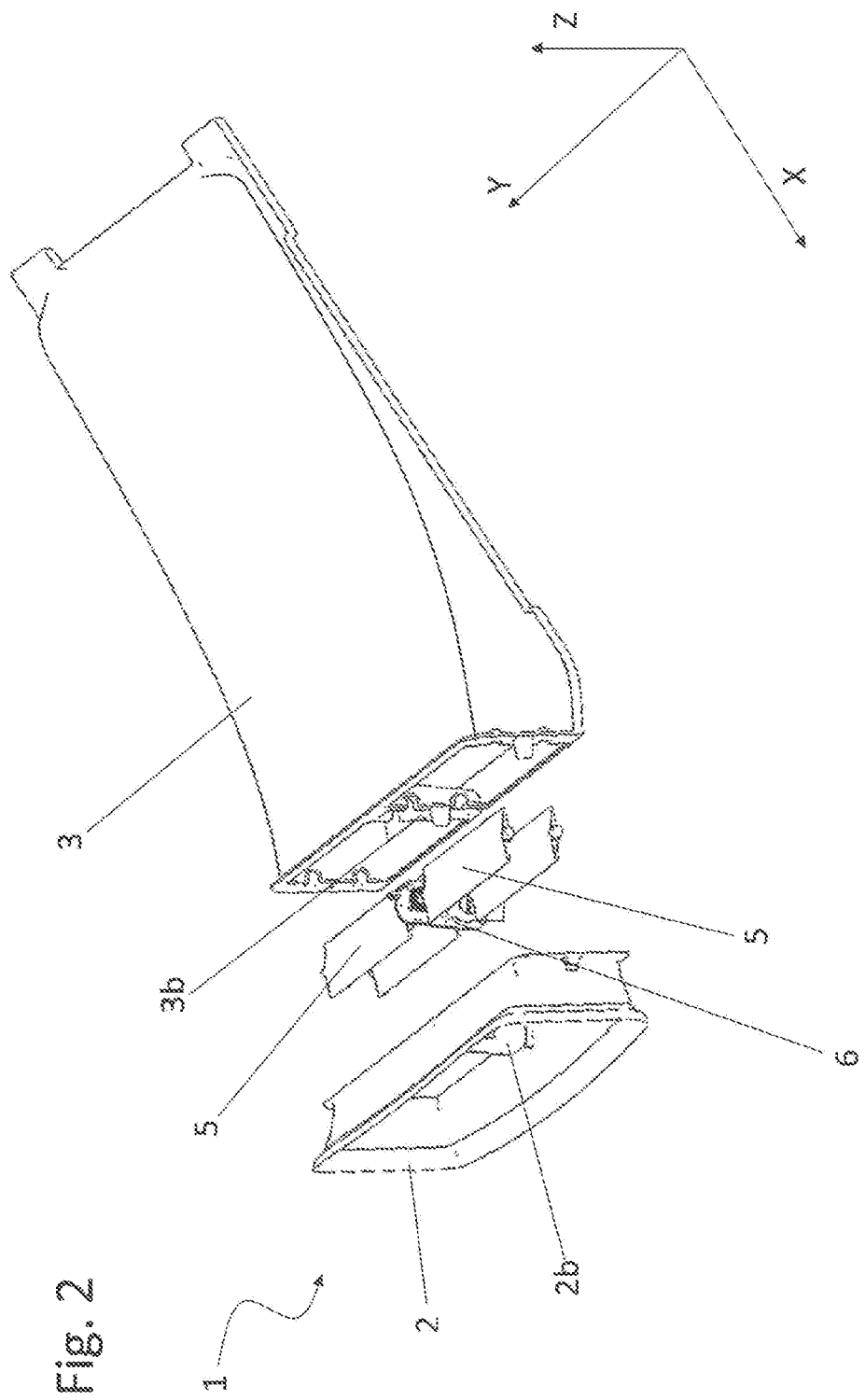
FIG. 2 shows another perspective depiction of the airflow device according to the invention, in an exploded view.

In the exploded drawing shown in FIG. 2, it can be seen that the drive 6 is held by two drive retention portions 2b and 3b, wherein a first drive retention portion 2b is arranged at the air intake part 2 and a second drive retention portion 3b is arranged at the airflow channel 3. These drive retention portions 2b and 3b are preferably integrally formed with the components 2 and 3.

Furthermore, the components 2 and 3, as indicated here, can have flanges on their outer edges which allow the two components 2 and 3 to be mounted—preferably without tools—by mutual contact of their end faces facing one another and having the flanges.

If the two components 2 and 3 are connected to one another, the drive 6 is simultaneously accommodated and fixed between the portions 2b and 3b; this state is shown in particular in the section in the plane A (FIG. 1) in FIG. 4.

Furthermore, the air-regulating lamella(s) 5 is/are pivotably mounted on the airflow device 1 by pivot bearing pins. For this purpose, as shown in FIG. 5 the air intake part 2 has a corresponding second bearing portion 2a, and the airflow channel 3 correspondingly has a second bearing portion 3c. The two bearing portions 2a and 3c together form the respective pivot bearing in which the pivot bearing pins 7 of the lamellas 5 are accommodated. The portion 2a serves simultaneously as a contact flange for the portion 3a of the airflow channel 3 acting as a contact flange. These contact flanges 2a and 3a can additionally have a seal between them, or can themselves be designed to seal. For example, a corresponding sealing lip can be attached or molded on each of the components 2 and 3.

Via the airflow device 1 described above, it is thus possible to realize a corresponding airflow system with air-regulating lamellas 5 with an utmost saving of components.

The invention claimed is:

1. An airflow device (1) for regulating the air intake (4) in vehicle front ends, the airflow device (1) comprising:
   an air intake part (2) through which air can enter into the airflow device (1);
   an airflow channel (3) arranged downstream of the air intake part (2) and connected thereto, through which the air entering through the air intake part (2) can be conducted; and
   at least one air-regulating lamella (5) which is pivotably mounted on the airflow device (1) on a pivot bearing (3c, 2a) and is configured and arranged such that the at least one air-regulating lamella (5) can influence the air flow entering through the air intake part (2) by changing its pivot position,
   wherein the air intake part (2) and the airflow channel (3) are separate components from each other, wherein the pivot bearing (3c, 2a) for the at least one air-regulating lamella (5) is formed by a first bearing portion (2a) which is part of the air intake part (2) and by a second bearing portion (3c) which is part of the airflow channel (3), wherein the air intake part (2) comprises a drive (6) coupled to the at least one air-regulating lamella (5), which drive (6) pivots the at least one air-regulating lamella (5) in the event of an actuation of the drive (6), wherein the air intake part (2) has a first drive retention portion (2b), and the airflow channel (3) has a second drive retention portion (3b), wherein the drive (6) is accommodated between the first drive retention portion (2b) and the second drive retention portion (3b).

2. The airflow device (1) in accordance with claim 1, further comprising a fastening element that is arranged in the region of an end face of the air intake part (2) facing toward the airflow channel, and/or in the region of an end face of the airflow channel (3) facing toward the air intake part (2).

3. The airflow device (1) in accordance with claim 1, further comprising a circumferential sealing element that is arranged in the region of an end face of the air intake part (2) facing toward the airflow channel, and/or in the region of an end face of the airflow channel (3) facing toward the air intake part (2).

4. The airflow device (1) in accordance with claim 1, wherein the first bearing portion (2a) is integrally formed with the air intake part (2).

5. The airflow device (1) in accordance with claim 1, wherein the second bearing portion (3c) is integrally formed with the airflow channel (2).

6. The airflow device (1) in accordance with claim 1, wherein the drive (6) is fixed to the air intake part (2) and/or to the airflow channel (3).

7. The airflow device (1) in accordance with claim 2, further comprising a circumferential sealing element that is arranged in the region of the end face of the air intake part (2) facing toward the airflow channel, and/or in the region of the end face of the airflow channel (3) facing toward the air intake part (2).

8. The airflow device (1) in accordance with claim 4, wherein the second bearing portion (3c) is integrally formed with the airflow channel (2).

* * * * *